United States Patent
Corddry et al.

(10) Patent No.: US 8,380,942 B1
(45) Date of Patent: Feb. 19, 2013

(54) MANAGING DATA STORAGE

(75) Inventors: Matthew T. Corddry, Seattle, WA (US); Benjamin Earle McGough, Seattle, WA (US); Michael W. Schrempp, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 494 days.

(21) Appl. No.: 12/474,909

(22) Filed: May 29, 2009

(51) Int. Cl.
*G06F 12/00* (2006.01)
(52) U.S. Cl. ........ 711/154; 711/156; 711/158; 711/170; 711/172; 711/173
(58) Field of Classification Search .................. 711/154, 711/156, 158, 170, 172, 173
See application file for complete search history.

(56) References Cited

U.S. PATENT DOCUMENTS

| | | | |
|---|---|---|---|
| 6,393,511 B1* | 5/2002 | Albrecht et al. | 711/4 |
| 6,957,158 B1* | 10/2005 | Hancock et al. | 702/61 |
| 2006/0036605 A1* | 2/2006 | Powell et al. | 707/10 |
| 2008/0052458 A1* | 2/2008 | Micheloni et al. | 711/113 |
| 2008/0235468 A1* | 9/2008 | Chen et al. | 711/154 |
| 2009/0100244 A1* | 4/2009 | Chang et al. | 711/172 |
| 2010/0095048 A1* | 4/2010 | Bechtolsheim et al. | 711/103 |
| 2010/0138682 A1* | 6/2010 | Obana et al. | 713/340 |

* cited by examiner

*Primary Examiner* — Huan Hoang
*Assistant Examiner* — Jay Radke
(74) *Attorney, Agent, or Firm* — Thomas | Horstemeyer, LLP

(57) ABSTRACT

Disclosed are various embodiments including systems and methods relating to the management of heat load in a data center. An access frequency of a data object is estimated in a computing device. The data object is stored in at least one of a plurality of storage units. Each of the storage units comprises a plurality of solid-state storage devices in a proximal arrangement. The storing is based at least in part on the access frequency of the data object and a density of the arrangement of the solid-state storage devices within the at least one of the storage units.

32 Claims, 5 Drawing Sheets

MANAGING DATA STORAGE

BACKGROUND

A data center providing a data storage service typically contains numerous racks, with each rack containing numerous data storage devices, such as hard drives. Hard drives contain several moving parts, such as rotating magnetic platters, which are kept constantly spinning. Hard drives take up considerable space in data centers due to their mechanical nature. Also, hard drives can be prone to failure due to their mechanical parts and potentially fragile construction.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
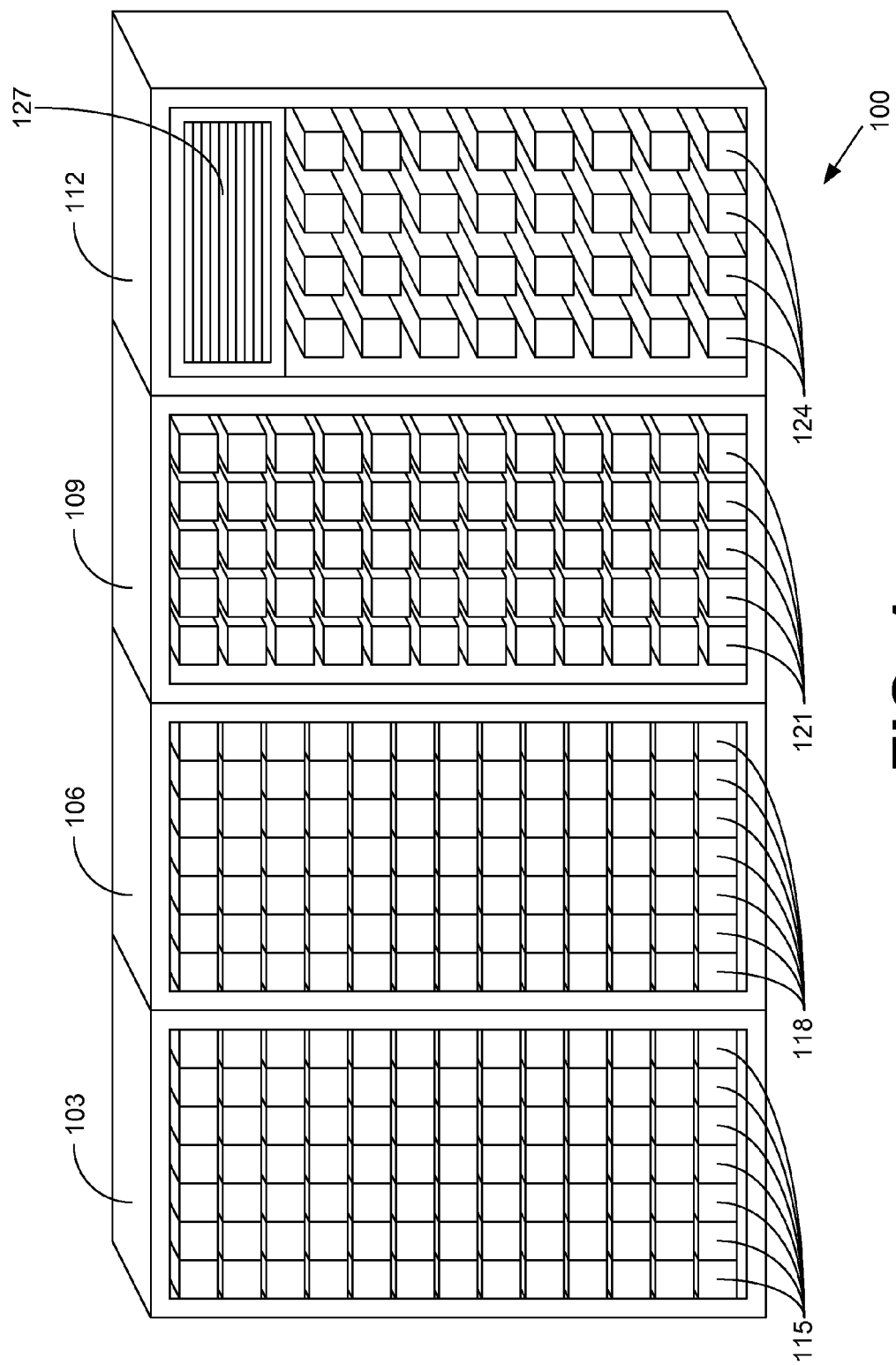
FIG. 1 is a drawing that illustrates an example of a data center according to various embodiments of the present disclosure.

Power consumption and heat dissipation are major cost concerns for data centers providing storage services. Storage devices, typically hard drives, consume power and produce heat. A hard drive is a non-volatile storage device which stores data on rapidly spinning platters with magnetic surfaces. In order to ensure rapid response, data centers normally keep the platters in the hard drives spinning at all times, which consumes even more power and produces even more heat than ordinary home or business use. To dissipate the heat produced, the hard drives are generally widely spaced within a storage unit, such as a rack or other enclosure. Additionally, a data center may use fans or other cooling equipment to move cool air through the storage unit. Thus, more space in the data center is needed than in a scenario in which the hard drives are closely packed.

Solid-state storage devices present an alternative to hard drives and offer reduced power consumption and reduced heat load. Solid-state storage devices incorporate solid-state memory, such as, for example, NAND flash non-volatile memory. Solid-state storage devices currently consume less than 2 watts of power, compared to between 12 and 18 watts for high-speed hard drives. Not only do solid-state storage devices consume less power than hard drives when in use, but they also may be normally powered off, compared to the hard drives that are constantly spinning. A normally powered-off state is possible because data may be accessed from an initially powered-off solid-state storage device faster than from an initially powered-off hard drive because the hard drive needs to spin-up the platters to operating speed and mechanically seek the desired data before reading it. Solid-state storage devices may be powered on and available for data reads and writes much more quickly than hard drives.

In many environments, the data stored in a data center is not accessed very frequently. Despite the infrequency of access, there is an expectation that the data be accessible fairly quickly. However, it is a waste of resources to keep a hard drive constantly spinning when the data stored on the hard drive is accessed, for example, only once a year. Solid-state storage devices present a clear advantage in such cases.

Solid-state storage devices have not been widely deployed in data centers because of their relatively high cost compared to hard drives. However, solid-state storage devices have an extended lifespan compared to hard drives and would be better suited than hard drives toward long-term archival of data. In fact, over the long run, solid-state storage devices can be cost competitive considering the savings from not replacing hard drives, reduced power consumption, reduced cooling requirements, etc. Also, hard drives often need to be removed from their mounting or enclosure when they fail. By contrast, mountings or enclosures for solid-state storage devices may be simplified not to provide for device removal, thereby potentially reducing cost and/or increasing density.

Described herein is a system for managing data storage through the use of solid-state storage devices. In various embodiments, data is distributed for storage to storage units comprising proximally arranged solid-state storage devices based on an estimated access frequency of the data and a density of the arrangement of the solid-state storage devices within the storage units. Because solid-state storage devices are normally powered off, the access frequency of the data stored by a solid-state storage device can be correlated with the power consumption and resulting heat load of the solid-state storage device.

As a non-limiting example, infrequently accessed data objects may be stored on a solid-state storage device within a high density arrangement of such storage devices, while frequently accessed data objects may be stored on a solid-state storage device within a low density arrangement of such storage devices. Alternatively, frequently accessed data objects may be stored on hard drives. The system may provide for a greater overall data storage density within a given area when compared to systems primarily using hard drives. In the following discussion, a general description of the system and its components is provided, followed by a discussion of the operation of the same.

With reference to FIG. 1, shown is a drawing that illustrates an example of a portion of a data center 100 according to various embodiments of the present disclosure. Although a data center 100 is depicted, it is understood that the system may be deployed in other environments, such as remotely located storage units, home or office storage units, and/or any other data storage environment. The data center 100 comprises enclosures 103, 106, 109, and 112. Although four enclosures are depicted for simplicity, it is understood that the data center 100 may comprise any number of such enclosures, including hundreds or thousands of enclosures.

As depicted in FIG. 1, enclosures 103, 106, 109, and 112 are commercially available equipment racks. However, enclosures 103, 106, 109, and 112 may be any type of chassis designed to hold electronics equipment such as solid-state storage devices. In some embodiments, enclosures 103, 106, 109, and 112 may be smaller or larger in form than as depicted in FIG. 1. In some embodiments, enclosures 103, 106, 109, and 112 may be fully sealed, fully enclosed, partially enclosed, a mounting skeleton, etc. In some embodiments, enclosures 103, 106, 109, and 112 may have ventilation holes, slots, louvers, panels, etc. In other embodiments, enclosures 103, 106, 109, and 112 may have restricted ventilation.

Each enclosure 103, 106, 109, and 112 includes a respective plurality of solid-state storage devices 115, 118, 121, and 124. Enclosures 103, 106, 109, and 112 may include one or more devices comprising control logic, buses, and/or backplanes to connect the respective solid-state storage devices 115, 118, 121, and 124 to a network, such as a storage area network (SAN) or other network. In other embodiments, each respective solid-state storage device 115, 118, 121, and 124 includes such control logic, buses, and/or backplanes.

Enclosures 106, 109, and 112 illustrate varying densities of solid-state storage devices 118, 121, and 124. In particular, enclosure 106 contains more solid-state storage devices 118 in the same amount of space when compared with enclosure 109 and solid-state storage devices 121. Likewise, enclosure 109 contains more solid-state storage devices 121 per unit area when compared with enclosure 112 and solid-state storage devices 124. Consequently, greater ventilation may be provided for each solid-state storage device 121 than each solid-state storage device 118. It follows that heat is more easily dissipated for each solid-state storage device 121 than for each solid-state storage device 118. Further, fewer storage devices per unit area result in less heat being produced. In embodiments comprising a sealed enclosure, access to data stored on the solid-state storage devices may be carefully planned and controlled, for example, so that the generated heat does not exceed any radiant cooling characteristic associated with the sealed enclosure.

Accordingly, the data on solid-state storage devices 121 may be more frequently accessed for reading or writing data than the data on solid-state storage devices 118 because data access on solid-state storage devices is correlated with power consumption and heat production, in contrast to hard drives that are constantly powered and spinning. Considering this characteristic, it may be desired to store data that is more frequently accessed, for example, on solid-state storage devices 121 than on solid-state storage devices 118. Additionally, or alternatively, it may be desired to distribute the data in an equitable manner such that the heat loads of solid-state storage devices 118 and 121 approach design specifications. This factor is considered in addition to the respective data capacities of the solid-state storage devices 118 and 121 and the quantity of the particular data. In some embodiments, data may be distributed to any solid-state storage device within a particular enclosure, while in other embodiments, data may be distributed to specific solid-state storage devices. In other words, heat load may be determined and/or estimated on a per-enclosure basis, a per-storage-device basis, or by some other unit. Note that the overall access rate to each enclosure 103, 106, 109, and/or 112 determines the heat generation within the respective enclosure 103, 106, 109, and/or 112.

As a non-limiting example, enclosures 103 and 106 contain solid-state storage devices 115 and 118 that are installed at the same density. To manage the heat load of the solid-state storage devices 115 and 118, data may be distributed based on the relative heat load or heat capacity within the respective enclosure 103 or 106. In this example, the solid-state storage devices 115 and 118 may have the same heat capacity, although frequently accessed data may be directed, in some embodiments, to some solid-state storage devices 115 or 118 more than others.

Additionally, as a non-limiting example, enclosure 112 may include one or more cooling devices 127 that facilitate ventilation and/or cooling of the enclosure 112, thereby permitting a greater frequency of data accesses and/or a greater density of solid-state storage devices 124 within the enclosure 112. The cooling device 127 may comprise, for example, fans, heatsinks, air conditioners, water coolant systems, etc.

Figure 2:
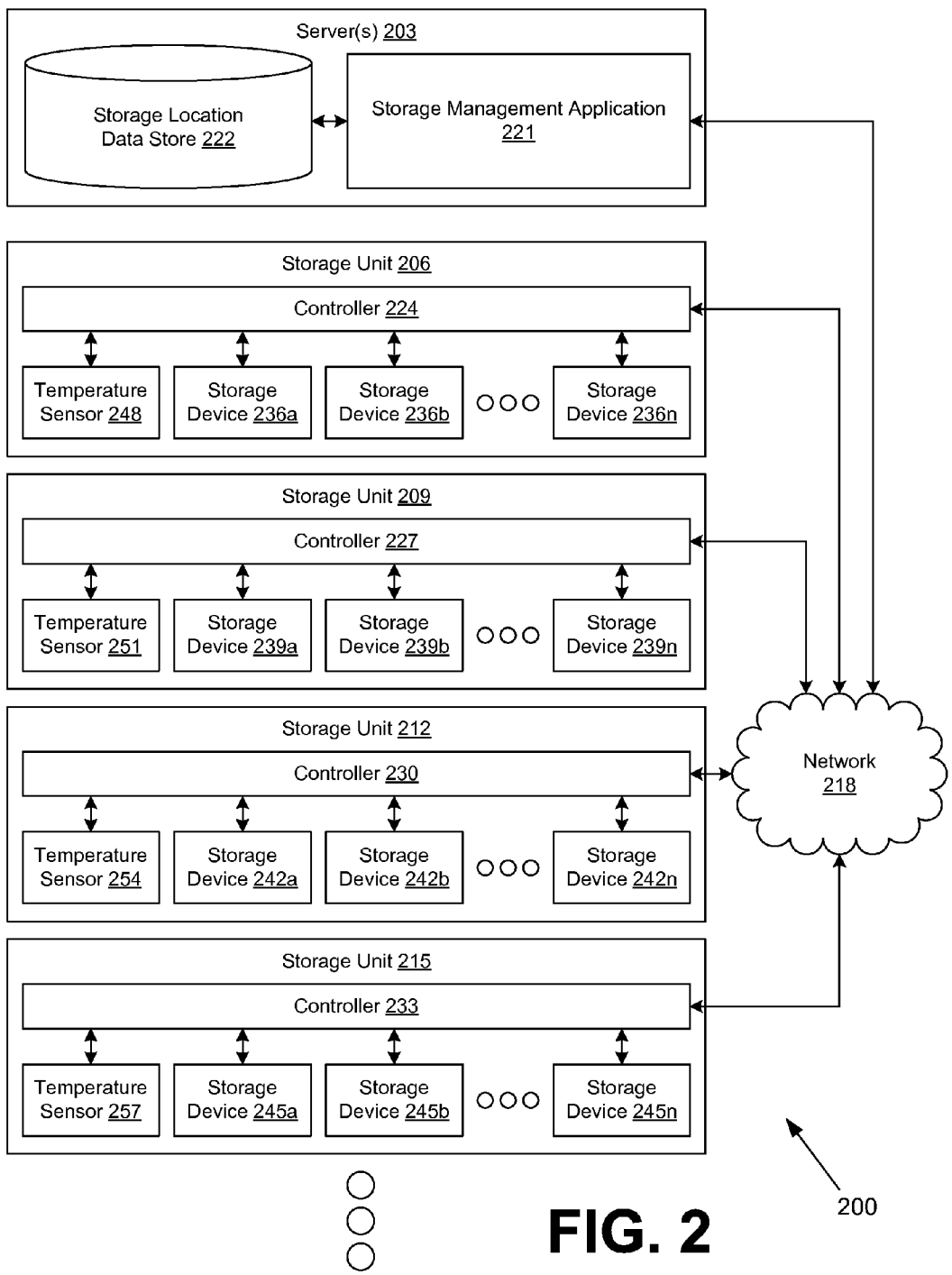
FIG. 2 is a drawing of a data storage network according to various embodiments of the present disclosure.

Turning now to FIG. 2, shown is a data storage network 200 according to various embodiments of the present disclosure. The data storage network 200 includes a server 203 that is in data communication with storage units 206, 209, 212, and 215 by way of a network 218. Although four storage units 206, 209, 212, and 215 are illustrated in FIG. 2, this depiction is not intended to be limiting, and it is understood that there may be any number of storage units in data communication with the server 203. The network 218 includes, for example, the Internet, intranets, extranets, wide area networks (WANs), local area networks (LANs), wired networks, wireless networks, or other suitable networks, etc., or any combination of two or more such networks.

The server 203 may comprise, for example, a computing device such as a server computer or like system. The server 203 may represent multiple servers arranged, for example, in one or more server banks or other arrangements. Such servers 203 may be located in a single installation or may be dispersed among many different geographical locations. For purposes of convenience, the server 203 is referred to herein in the singular. However, in one embodiment, the server 203 represents a plurality of servers arranged as described above.

The server 203 is configured to execute various applications such as, for example, a storage management application 221 and other applications. The storage management application 221 is executed to distribute data objects, such as files, to the storage units 206, 209, 212, and 215 and to perform other functions as will be described. Also, the server 203 includes a storage location data store 222 and potentially other data stores, which may comprise data and applications operable to provide access to the data. The storage location data store 222 may be used to store data describing the locations of stored data objects within storage units 206, 209, 212, and 215 and potentially other data.

Each storage unit 206, 209, 212, and 215 may correspond to an enclosure 103, 106, 109, or 112 (FIG. 1). Alternatively, or additionally, a storage unit 206, 209, 212, and 215 may correspond to one of, or a subset of, storage devices within a larger enclosure; e.g., enclosures 103, 106, 109, or 112. Each storage unit 206, 209, 212, and 215 may comprise, for example, a processor-based system such as a server computer or like system.

Each storage unit 206, 209, 212, and 215 comprises a respective controller 224, 227, 230, and 233. Each controller 224, 227, 230, and 233 is in data communication with a respective plurality of storage devices 236a-n, 239a-n, 242a-n, and 245a-n. Furthermore, a storage unit 206, 209, 212, and 215 may include specialized external buses and backplanes to facilitate data communication between the controllers 224, 227, 230, and 233 and the respective storage devices 236a-n, 239a-n, 242a-n, and 245a-n. The controllers 224, 227, 230, and 233 may be, for example, an application executable on a general-purpose processor, dedicated logic, etc. In some embodiments, the functionality of the controllers 224, 227, 230, and 233 may be performed by the storage management application 221 executing on the server 203.

Each of the storage devices 236a-n, 239a-n, 242a-n, and 245a-n comprises a solid-state storage device, such as solid-state storage devices 115, 118, 121, 124 (FIG. 1), and incorporate solid-state memory, such as, for example, NAND flash non-volatile memory, or other non-volatile solid-state memory devices. In some embodiments, storage devices 236*a-n*, 239*a-n*, 242*a-n*, and 245*a-n* may incorporate, for example, DRAM-based volatile memory, or other volatile solid-state memory devices. Volatile solid-state memory devices would potentially offer heat, power, and/or access time benefits over, for example, hard drives, but require some amount of power in order to retain memory. It is understood that a non-volatile solid-state memory device may incorporate some amount of volatile solid-state memory for caching and/or other purposes without interfering with the general benefits of non-volatile solid-state memory (i.e., data retention when the device is powered off and other benefits).

Each storage unit 206, 209, 212, and 215 further comprises one or more respective temperature sensors 248, 251, 254, and 257. Temperature sensors 248, 251, 254, and 257 are configured to determine the temperature within the respective storage unit 206, 209, 212, and 215 and/or the temperature of individual, and/or groups of, storage devices within the storage unit. Temperature sensors 248, 251, 254, and 257 may be in data communication with, for example, their respective controller 224, 227, 230, and 233 and/or the storage management application 221.

Next, a discussion of the operation of the components in the data storage network 200 is provided. The storage management application 221 receives a data object, such as a file, to be stored within the data storage network 200. The storage management application 221 then determines where the data object may be stored. In this determination, the storage management application 221 determines an estimated access frequency associated with the data object. The access frequency represents how frequently that data object is predicted to be accessed or how frequently the data object has been accessed in the past. The access frequency may be estimated by the storage management application 221 based, for example, on characteristics associated with the data object, such as file types and file sizes, customer priority level, and other factors. The access frequency may also be determined through actual access history statistics relating to the data object or to the customer or may be otherwise designated and provided to the storage management application 221 by the customer. In some embodiments, the access frequency may be normalized by the size of the data object.

Once the estimated access frequency is determined for the data object, the storage management application 221 stores the data object in at least one of the storage units 206, 209, 212, and 215 based on the access frequency and the density of the arrangement of the solid-state storage devices 236, 239, 242, and 245 within the respective storage units 206, 209, 212, and 215, the size of the data object to be stored, the capacity of the storage devices 236, 239, 242, and 245, and potentially other factors. Additionally, in some embodiments, the storage may also be based, for example, on a predicted heat load of the storage units 206, 209, 212, and 215 or the storage devices 236, 239, 242, and 245. Such predicted heat loads may be determined, for example, by the access frequency of the data object and a current heat load of the storage units 206, 209, 212, and 215 or the storage devices 236, 239, 242, and 245. The current heat load may be determined, for example, through the use of temperature sensors 248, 251, 254, and/or 257, by estimation based on the access frequency of the respective storage devices 236, 239, 242, 245 or the access frequencies of the data stored on those devices, or by some other method.

In the system described herein, the heat loads associated with the storage units 206, 209, 212, and 215 and the storage devices 236, 239, 242, and 245 are predictable because of the correlation between data access and power consumption/heat production. In an embodiment, storage devices 236, 239, 242, and 245 generate heat individually only when data stored on those devices is accessed. This is due to the characteristic of solid-state storage devices 236, 239, 242, and 245 in that they may be powered off when not in use. In other embodiments, DRAM-based volatile solid-state storage devices and hard drives may be used to store data that is so frequently accessed that efficiency gains owing to the use of non-volatile solid-state storage devices 236, 239, 242, and 245 cannot be fully realized in view of relative cost and/or other factors.

In some embodiments, it may be desirable to keep the heat load and temperature within a given storage unit 206, 209, 212, or 215 from reaching a predetermined threshold. For example, it may be desired to keep the heat load and temperature from exceeding a maximum temperature because damage to components can result from an operating temperature that is too high. Furthermore, floor space in a data center can be less costly when cooling is not required. In some embodiments, particularly in data centers situated in extreme locations, it may be desirable to increase the heat load and temperature to prevent a reading or estimate from falling below a minimum temperature. In like manner, the heat load can be managed by the storage management application 221 in order to increase operating temperature and maintain the operating temperature within a desired window. As a non-limiting example, a data center 100 (FIG. 1) or other storage environment may be located in a frigid region where a certain heat load would be needed to keep the temperature at a desired level.

Moreover, in some embodiments, the storage management application 221 or a respective controller 224, 227, 230, or 233 may initiate proactive accesses or reads of data (e.g., dummy reads). Further, in some embodiments, a data object stored in one of the storage units 206, 209, 212, or 215 may be accessed through such dummy reads solely for the purpose of producing heat within the storage unit 206, 209, 212, or 215. In some embodiments, verification and/or maintenance operations may be performed on data objects for the purpose of producing heat and for the purposes of verification and/or maintenance.

As a non-limiting example, and for the purposes of discussion, assume that the storage management application 221 chooses storage unit 206 to store a particular data object D. The storage management application 221 may then transfer D over the network 218 to the controller 224 of the storage unit 206. In an embodiment, the storage management application 221 may instruct the controller 224 to store D in a particular storage device 236*a*. In another embodiment, the controller 224 may select a particular storage device 236*b* in which to store D. If the controller 224 is to select a storage device 236, the selection may be based on access frequency of D and density of the arrangement of the storage devices 236, the current and/or predicted heat load of the storage devices 236, or on other factors. In some embodiments, the controller 224 may select a storage device 236 randomly, in round-robin manner, or by some other method not considering heat load characteristics.

In various embodiments, the controller 224 may store redundant copies of D in a plurality of storage devices 236. Additionally, large data objects may be split up into smaller data objects, which are dispersed for storage among a plurality of storage devices 236. In some cases, copies and/or parts of D may be stored on storage devices having different densities (e.g., storage devices 242, 245). As a non-limiting example, a copy of D may be stored in a "deep freeze" storage location having a very high device density when the copy is designed to be very rarely accessed, such as when other copies of D cannot be accessed. As another non-limiting example, if D is estimated to be frequently accessed, a copy of D may be stored on a hard drive, while other copies of D are stored on solid-state storage devices. In one embodiment, copies and/or parts of D are stored on multiple storage devices 236 based on the respective temperature of each storage device 236.

Once D is stored, as a non-limiting example, on storage device 236a, the storage management application 221 or the controller 224 may move D to another storage unit 206, 209, 212, or 215 or storage device 236, 239, 242, or 245 based on updated heat load information. Moving data objects may be necessary, for example, if the estimated access frequency was inaccurate and the actual access frequency for the stored data objects is generating too much or too little heat for the respective storage unit or device. Such updated heat load information may be provided by a temperature sensor 248 or determined based on updated access frequency statistics for data. The movement of data may be prompted by a temperature reading from the temperature sensor 248 meeting a predetermined threshold. In some embodiments, data objects may be duplicated with copies dispersed among other storage units 206, 209, 212, and/or 215 or storage devices 236, 239, 242, or 245 based on updated heat load and/or access frequency information. Additionally, data may be initially stored, moved, and/or duplicated to correct variations in temperature and to stabilize the heat load of the storage unit 206 or storage device 236a. By reducing "hot spots" and temperature swings, the lifetime of the electronics may be extended.

When storing data objects to specific storage units 206, 209, 212, or 215 or storage devices 236, 239, 242, or 245, the storage management application 221 may store metadata about the data objects such as storage location to the storage location data store 222. In an embodiment, when the storage management application 221 needs to retrieve a particular data object, the storage management application 221 may obtain location information about the data object from the storage location data store 222. Additionally, other metadata associated with data objects, such as access frequency, access history, etc., may be stored in the storage location data store 222.

Figure 3:
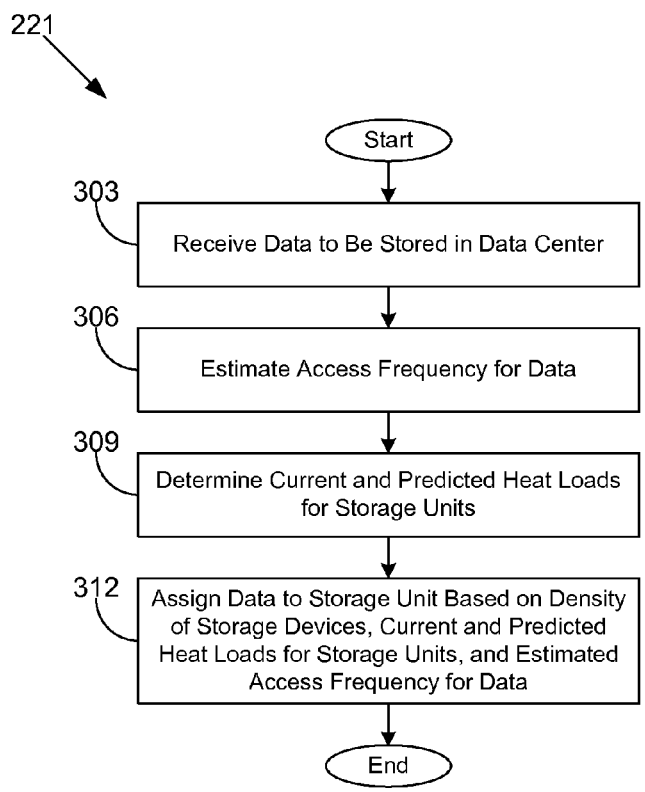
FIG. 3 is a flowchart that provides one example of functionality for a storage management application employed in the data storage network of FIG. 2 according to an embodiment of the present disclosure.

Referring next to FIG. 3, shown is a flowchart that provides one example of the operation of a portion of the storage management application 221 (FIG. 2) according to an embodiment of the present disclosure. In particular, FIG. 3 provides one example of the functionality involved in the storage management application 221 determining a storage location for a given data item. It is understood that the flowchart of FIG. 3 provides merely an example of the many different types of functional arrangements that may be employed to implement the operation of the storage management application 221 as described herein. As an alternative, the flowchart of FIG. 3 may be viewed as depicting an example of steps of a method implemented in the server 203 (FIG. 2) according to one or more embodiments.

Beginning with box 303, the storage management application 221 receives data to be stored in the data center. Such data may be received, for example, over a data communications network such as network 218 (FIG. 2). Next, in box 306, the storage management application 221 estimates an access frequency for the data. The estimated access frequency may have been provided to the storage management application 221 along with the data, may be estimated by the storage management application 221 based on historical access data associated with the particular data, and/or may be determined by other factors and methods.

In box 309, the storage management application 221 determines current and predicted heat loads for each of the storage units 206, 209, 212, and 215 (FIG. 2). This determination may be based on temperature data provided by temperature sensors 248, 251, 254, and 257 (FIG. 2), data access history for the storage units 206, 209, 212, and 215 and correlation to temperature, and/or other factors. The storage management application 221 may consider, for example, the predicted temperature change caused by the estimated access frequency for the data in determining predicted heat loads.

Next, the storage management application 221 proceeds to box 312 and assigns and/or stores the data in a storage unit 206, 209, 212, or 215 (or particular storage device 236, 239, 242, or 245 (FIG. 2) within a storage unit 206, 209, 212, or 215) based on the density of the arrangement of the storage devices 236, 239, 242, or 245 within the storage unit 206, 209, 212, or 215, the current and predicted heat loads for the storage units 206, 209, 212, and/or 215, the estimated access frequency for the data, and potentially other factors. The storage management application 221 may prioritize data having an estimated access frequency within a certain range to be assigned to certain storage devices 236, 239, 242, and/or 245 or storage units 206, 209, 212, and/or 215 based on the density of the arrangement of storage devices 236, 239, 242, and/or 245 in the storage unit 206, 209, 212, or 215. For example, data that is relatively frequently accessed for reading and/or writing data (i.e., having an estimated access frequency reaching a threshold) may be assigned to a storage unit 206, 209, 212, or 215 with a relatively low density arrangement of storage devices 236, 239, 242, or 245 (i.e., having an arrangement with a density reaching a threshold). The storage management application 221 then ends.

Figure 4:
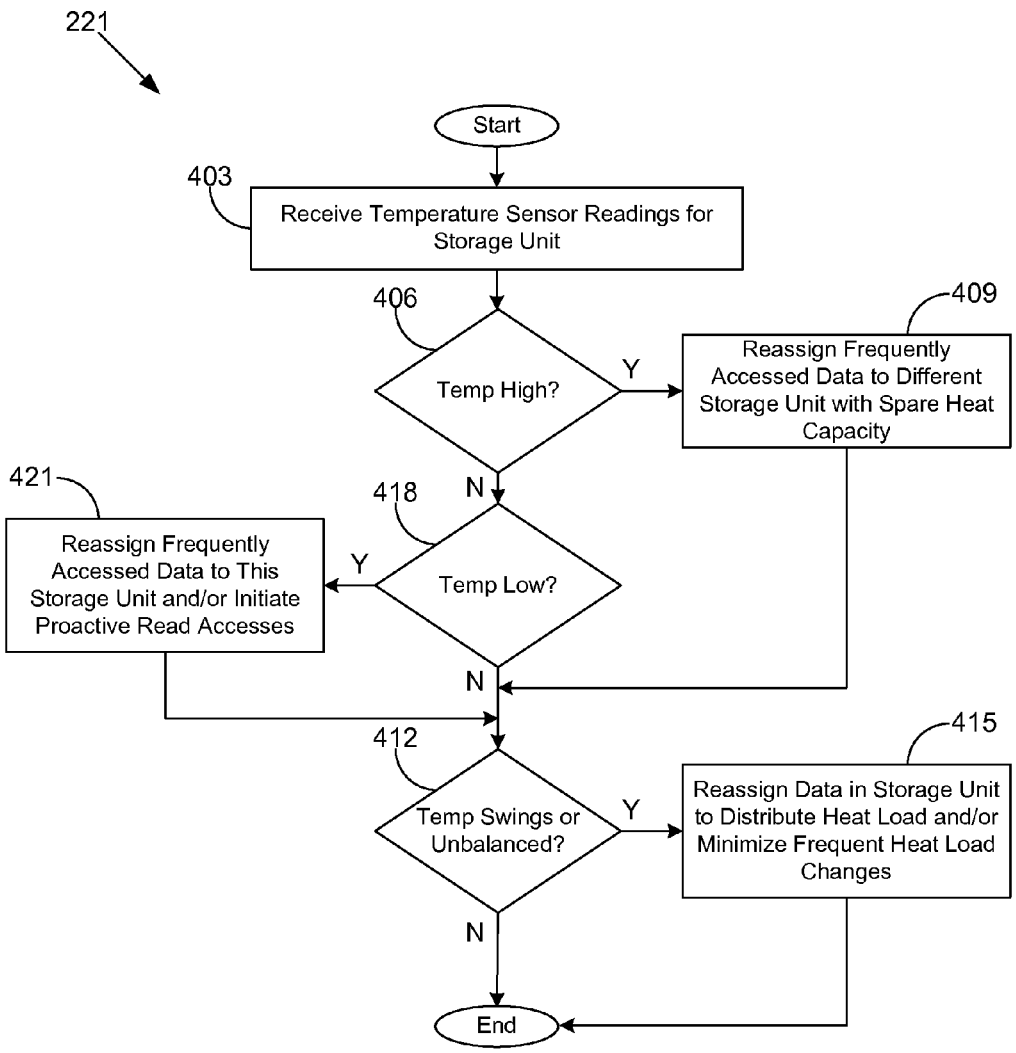
FIG. 4 is a flowchart that provides another example of functionality for a storage management application employed in the data storage network of FIG. 2 according to an embodiment of the present disclosure.

With reference to FIG. 4, shown is a flowchart that provides another example of the operation of a portion of the storage management application 221 (FIG. 2) according to an embodiment of the present disclosure. In particular, FIG. 4 provides one example of the functionality involved in the storage management application 221 reassigning data based on updated temperature sensor readings. It is understood that the flowchart of FIG. 4 provides merely an example of the many different types of functional arrangements that may be employed to implement the operation of the storage management application 221 as described herein. As an alternative, the flowchart of FIG. 4 may be viewed as depicting an example of steps of a method implemented in the server 203 (FIG. 2) according to one or more embodiments.

Beginning with box 403, the storage management application 221 receives temperature sensor readings for a storage unit 206, 209, 212, or 215 (FIG. 2). Such readings may be performed continually, on a regular basis, or in response to some event. The readings may represent the temperature of an area or storage device 236, 239, 242, or 245 (FIG. 2) within the storage unit 206, 209, 212, or 215 or of the entire storage unit 206, 209, 212, or 215 or portion thereof. In some embodiments, a temperature sensor reading may represent the ambient temperature within multiple storage units 206, 209, 212, and/or 215.

In box 406, the storage management application 221 determines whether the temperature reading is too high or meets a predetermined threshold. If the temperature reading is too high, the storage management application 221 moves to box 409 and reassigns frequently accessed data within the storage unit 206, 209, 212, or 215 to a different storage unit 206, 209, 212, or 215 with spare heat capacity. In other embodiments, the storage management application 221 may reassign data within the storage unit from one storage device 236, 239, 242, or 245 to another storage device 236, 239, 242, or 245. In some embodiments, the storage management application 221 may automatically create duplicate copies of frequently accessed data and disperse them among other storage devices 236, 239, 242, and/or 245, or storage units 206, 209, 212, and/or 215. Additionally, in some embodiments, the storage management application 221 may undertake other tasks, such as actuating a cooling device, ventilation fan, etc.

The storage management application 221 then moves to box 412 and determines whether the temperature sensor 248, 251, 254, and/or 257 readings are demonstrating temperature swings or represent unbalanced temperatures within the storage unit 206, 209, 212, or 215. If so, the storage management application moves to box 415 and reassigns data within the storage unit 206, 209, 212, or 215 to distribute the heat load and/or minimize frequent heat load changes, or temperature swings. The storage management application 221 then ends. If the storage management application 221 instead determines, in box 412, that the temperature sensor 248, 251, 254, and/or 257 readings do not demonstrate temperature swings or represent unbalanced temperatures, the storage management application 221 ends.

If, in box 406, the storage management application 221 instead determines that the temperature reading is not too high, the storage management application proceeds to box 418 and determines whether the temperature reading is too low or meets a predetermined threshold. If the temperature reading is too low, the storage management application 221 moves to box 421 and reassigns frequently accessed data to this storage unit 206, 209, 212, or 215 and/or initiates proactive read accesses, or "dummy reads," in order to increase the temperature within the storage unit 206, 209, 212, or 215. In other embodiments, the storage management application 221 may reassign frequently accessed data from storage devices 236, 239, 242, or 245 within the storage unit 206, 209, 212, or 215 to other storage devices 236, 239, 242, or 245 within the same storage unit 206, 209, 212, or 215 in order to increase the temperature within a portion of the storage unit 206, 209, 212, or 215. Additionally, in some embodiments, the storage management application 221 may undertake tasks such as actuating a heater or other device.

The storage management application 221 then moves to box 412 and determines whether the temperature sensor 248, 251, 254, and/or 257 readings are demonstrating temperature swings or represent unbalanced temperatures within the storage unit 206, 209, 212, or 215. If so, the storage management application moves to box 415 and reassigns data within the storage unit 206, 209, 212, or 215 to distribute the heat load and/or minimize frequent heat load changes, or temperature swings. The storage management application 221 then ends. If the storage management application 221 instead determines, in box 412, that the temperature sensor 248, 251, 254, and/or 257 readings do not demonstrate temperature swings or represent unbalanced temperatures, the storage management application 221 ends.

If, in box 418, the storage management application 221 instead determines that the temperature is not too low or meets a predetermined threshold, the storage management application 221 then moves to box 412 and determines whether the temperature sensor 248, 251, 254, and/or 257 readings are demonstrating temperature swings or represent unbalanced temperatures within the storage unit 206, 209, 212, or 215. If so, the storage management application moves to box 415 and reassigns data within the storage unit 206, 209, 212, or 215 to distribute the heat load and/or minimize frequent heat load changes, or temperature swings. The storage management application 221 then ends. If the storage management application 221 instead determines, in box 412, that the temperature sensor 248, 251, 254, and/or 257 readings do not demonstrate temperature swings or represent unbalanced temperatures, the storage management application 221 ends.

Figure 5:
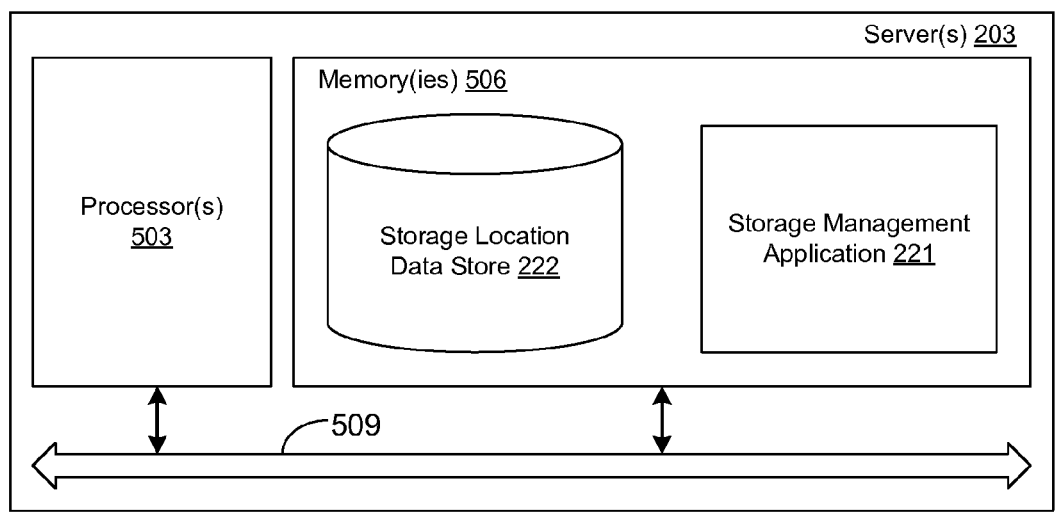
FIG. 5 is a schematic block diagram that illustrates one example of a server employed in the data storage network of FIG. 2 according to an embodiment of the present disclosure.

Referring next to FIG. 5, shown is a schematic block diagram of the server 203 (FIG. 2) according to an embodiment of the present disclosure. The server 203 includes a processor circuit, for example, having a processor 503 and a memory 506, both of which are coupled to a local interface 509. To this end, the server 203 may comprise, for example, a server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are a storage management application 221 (FIG. 2) and potentially other applications. Also stored in the memory 506 are the storage location data store 222 (FIG. 2) and other data. In addition, a server operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, Java, Java Script, Perl, Python, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that can retain data even when not powered. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors and the memory 506 may represent multiple memories that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the storage management application 221 (FIG. 2), the controllers 224, 227, 230, and 233 (FIG. 2) and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-4 show the functionality and operation of an implementation of portions of the storage management application 221 (FIG. 2). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 3-4 show a specific order of execution, it is understood that the order of execution may differ from that which is depicted. For example, the order of execution of two or more blocks may be scrambled relative to the order shown. Also, two or more blocks shown in succession in FIGS. 3-4 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including storage management application 221 (FIG. 2) and the controllers 224, 227, 230, and 233 (FIG. 2), that comprises software or code can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising the steps of:
   estimating, in at least one computing device, an access frequency of a data object;
   storing the data object in at least one of a plurality of storage units, each of the storage units comprising a plurality of solid-state storage devices in a proximal arrangement, the storing based at least in part on the access frequency of the data object and a density of the arrangement of the solid-state storage devices within the at least one of the storage units, the storing step further comprising the step of:
   storing the data object in at least one solid-state storage device within a storage unit based at least in part on a predicted heat load of the at least one solid-state storage device, the predicted heat load determined by the access frequency of the data object and a current heat load of the at least one solid-state storage device, the at least one solid-state storage device generating heat only when data stored by the at least one solid-state storage device is accessed;
   determining, in the at least one computing device, that a temperature associated with a first storage unit meets a predetermined threshold; and
   moving at least one frequently accessed data object from the first storage unit to a second storage unit to reduce the temperature.

2. A method, comprising the steps of:
   estimating, in at least one computing device, an access frequency of a data object; and
   storing the data object in at least one of a plurality of storage units, each of the storage units comprising a plurality of solid-state storage devices in a proximal arrangement, the storing based at least in part on the access frequency of the data object and a density of the arrangement of the solid-state storage devices within the at least one of the storage units.

3. The method of claim 2, wherein the storing step further comprises the step of storing the data object in the at least one of the storage units based at least in part on a predicted heat load of the at least one of the storage units, the predicted heat load determined by the access frequency of the data object and a current heat load of the at least one of the storage units.

4. The method of claim 3, wherein the current heat load is an estimate.

5. The method of claim 3, wherein the current heat load is determined by one or more temperature sensors associated with the at least one of the storage units.

6. The method of claim 3, further comprising the step of determining, in the at least one computing device, that a temperature associated with a first storage unit meets a predetermined threshold.

7. The method of claim 6, further comprising the step of moving at least one frequently accessed data object from the first storage unit to a second storage unit to reduce the temperature associated with the first storage unit.

8. The method of claim 6, further comprising the step of moving at least one frequently accessed data object from the second storage unit to the first storage unit to increase the temperature associated with the first storage unit.

9. The method of claim 6, further comprising the step of copying at least one frequently accessed data object stored on the first storage unit to a second storage unit to reduce the temperature associated with the first storage unit.

10. The method of claim 2, wherein each of the solid-state storage devices generates heat only when data stored by the respective solid-state storage device is being accessed.

11. The method of claim 2, wherein the storing step further comprises the step of storing the data object in at least one solid-state storage device within a storage unit based at least in part on a predicted heat load of the at least one solid-state storage device, the predicted heat load determined by the access frequency of the data object and a current heat load of the at least one solid-state storage device, the at least one solid-state storage device generating heat when data stored by the at least one solid-state storage device is accessed.

12. The method of claim 2, wherein the storing step further comprises the step of storing the data object in at least one solid-state storage device within a storage unit based at least in part on an access frequency of the at least one solid-state storage device.

13. The method of claim 2, wherein each of the storage units further comprises an enclosure.

14. The method of claim 13, wherein ventilation in the enclosure is restricted.

15. The method of claim 2, wherein the density of the arrangement of the solid-state storage devices of a first one of the storage units differs from the density of the arrangement of the solid-state storage devices of a second one of the storage units.

16. The method of claim 2, further comprising the step of initiating an access of a data object stored in one of the storage units solely for the purpose of producing heat within the storage unit.

17. The method of claim 2, further comprising the step of initiating a maintenance operation on a data object stored in one of the storage units for the purposes of maintenance and of producing heat within the storage unit.

18. The method of claim 2, wherein the estimating step further comprises the step of estimating, in the at least one computing device, the access frequency of the data object based at least in part on past accesses associated with the data object.

19. The method of claim 2, wherein the estimating step further comprises the step of estimating, in the at least one computing device, the access frequency of the data object based at least in part on metadata associated with the data object.

20. A system, comprising:
at least one computing device;
a plurality of storage units in data communication with the at least one computing device, each of the storage units comprising a plurality of solid-state storage devices in a proximal arrangement; and
a storage management application executable in the at least one computing device, the storage management application comprising:
logic that estimates an access frequency of a data object; and
logic that stores the data object in at least one of the storage units based at least in part on the access frequency of the data object and a density of the solid-state storage devices within the at least one of the storage units, wherein the density of the arrangement of the solid-state storage devices of a first one of the storage units differs from the density of the arrangement of the solid-state storage devices of a second one of the storage units.

21. The system of claim 20, wherein the logic that stores further comprises logic that stores the data object in the at least one of the storage units based at least in part on a predicted heat load of the at least one of the storage units, the predicted heat load determined by the access frequency of the data object and a current heat load of the at least one of the storage units.

22. The system of claim 21, wherein the current heat load is an estimate.

23. The system of claim 21, wherein the current heat load is determined by one or more temperature sensors associated with the at least one of the storage units.

24. The system of claim 21, wherein the storage management application further comprises logic that determines that a temperature associated with a first storage unit meets a predetermined threshold.

25. The system of claim 24, wherein the storage management application further comprises logic that moves at least one frequently accessed data object from the first storage unit to a second storage unit to reduce the temperature associated with the first storage unit.

26. The system of claim 24, wherein the storage management application further comprises logic that moves at least one frequently accessed data object from the second storage unit to the first storage unit to increase the temperature associated with the first storage unit.

27. The system of claim 20, wherein the solid-state storage devices generate heat only when being accessed.

28. The system of claim 20, wherein the logic that stores further comprises logic that stores the data object in at least one solid-state storage device within a storage unit based at least in part on a predicted heat load of the at least one solid-state storage device, the predicted heat load determined by the access frequency of the data object and a current heat load of the at least one solid-state storage device, the at least one solid-state storage device generating heat when data stored by the at least one solid-state storage device is accessed.

29. The system of claim 20, wherein the logic that stores further comprises logic that stores the data object in at least one solid-state storage device within a storage unit based at least in part on an access frequency of the at least one solid-state storage device.

30. The system of claim 20, wherein each of the storage units further comprises an enclosure.

31. The system of claim 30, wherein ventilation in the enclosure is restricted.

32. The system of claim 20, wherein the storage management application further comprises logic that initiates an access of a data object stored in one of the storage units solely for the purpose of producing heat within the storage unit.

* * * * *